United States Patent
Iiduka et al.

(10) Patent No.: US 11,113,562 B2
(45) Date of Patent: Sep. 7, 2021

(54) INFORMATION PROCESSING APPARATUS, CONTROL METHOD, AND PROGRAM

(71) Applicant: NEC Solution Innovators, Ltd., Tokyo (JP)

(72) Inventors: Hideo Iiduka, Tokyo (JP); Takashi Hayakawa, Tokyo (JP); Kiyoshi Ikeura, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 16/651,574

(22) PCT Filed: Oct. 2, 2018

(86) PCT No.: PCT/JP2018/036840
§ 371 (c)(1),
(2) Date: Mar. 27, 2020

(87) PCT Pub. No.: WO2019/069905
PCT Pub. Date: Apr. 11, 2019

(65) Prior Publication Data
US 2020/0257928 A1    Aug. 13, 2020

(30) Foreign Application Priority Data

Oct. 4, 2017    (JP) .............................. JP2017-194499

(51) Int. Cl.
*G06K 9/62*    (2006.01)
*G06K 9/00*    (2006.01)

(52) U.S. Cl.
CPC ....... *G06K 9/6212* (2013.01); *G06K 9/00771* (2013.01); *G06K 9/6209* (2013.01); *G06K 9/6262* (2013.01)

(58) Field of Classification Search
CPC ............. G06K 9/6212; G06K 9/00771; G06K 9/6209; G06K 9/6262
(Continued)

(56) References Cited

U.S. PATENT DOCUMENTS

2010/0036792 A1* 2/2010 Sawada ................... G10L 17/10
                                                          706/52
2016/0077631 A1* 3/2016 Yamamoto .............. G06F 3/044
                                                          345/174

FOREIGN PATENT DOCUMENTS

| JP | 2009-044249 A | 2/2009 |
| JP | 2012-098791 A | 5/2012 |
| JP | 2017-143379 A | 8/2017 |

OTHER PUBLICATIONS

International Search Report for PCT Application No. PCT/JP2018/036840, dated Dec. 25, 2018.

* cited by examiner

*Primary Examiner* — Ayodeji O Ayotunde
(74) *Attorney, Agent, or Firm* — Sughrue Mion, PLLC

(57) ABSTRACT

The first apparatus (2100) computes an determination accuracy representing a probability that it is correct to use, as a determination result, the first result. The first apparatus (2100) outputs the first result as the determination result in a case where the determination accuracy is greater than a first threshold value, and outputs a second result as the determination result in a case where the determination accuracy is smaller than a second threshold value. In a case where the determination accuracy is equal to or greater than the second threshold value and is equal to or smaller than the first threshold value, the first apparatus (2100) requests the second apparatus (2200) to perform the predefined determination on the determination target. The first apparatus (2100) updates at least one of the first threshold value and the (Continued)

second threshold value based on the determination result output by the second apparatus (2200).

20 Claims, 11 Drawing Sheets

(58) Field of Classification Search
USPC .......................................................... 382/190
See application file for complete search history.

INFORMATION PROCESSING APPARATUS, CONTROL METHOD, AND PROGRAM

This application is a National Stage Entry of PCT/JP2018/036840 filed on Oct. 2, 2018, which claims priority from Japanese Patent Application 2017-194499 filed on Oct. 4, 2017, the contents of all of which are incorporated herein by reference, in their entirety.

TECHNICAL FIELD

The present invention relates to an information processing apparatus, a control method, and a program.

BACKGROUND ART

A technology for performing various determinations on data of a target for the determinations by using a computer has been developed. For example, Patent Document 1 discloses a technology for determining whether or not a water level of a water channel reaches a predefined water level by using an image of a surveillance camera.

RELATED DOCUMENT

Patent Document

[Patent Document 1] Japanese Patent Application Publication No. 2017-143379

SUMMARY OF THE INVENTION

Technical Problem

The present inventor has developed a new technology for performing the determination on the data as the determination target. An object of the present invention is to provide a new technology for performing a determination on data as a determination target.

Solution to Problem

An information processing apparatus according to the present invention includes 1) a determining unit that computes determination accuracy representing a probability that it is correct to use a first result as a result of a predefined determination on a determination target, and performs the predefined determination on the determination target based on the computed determination accuracy. The determining unit outputs the first evaluation as the result of the predefined determination in a case where the determination accuracy is greater than a first threshold value, and outputs a second result as the result of the predefined determination in a case where the determination accuracy is smaller than a second threshold value (the first threshold value>the second threshold value).

The information processing apparatus according to the present invention includes 2) a requesting unit that transmits a first request for requesting the predefined determination on the determination target to a first other apparatus in a case where the determination accuracy is equal to or greater than the second threshold value and is equal to or smaller than the first threshold value, and 3) an updating unit that updates at least one of the first threshold value and the second threshold value based on the result of the predefined determination performed by the first other apparatus.

The first other apparatus performs the predefined determination by a method different from the determining unit.

An information processing system according to the present invention includes a first apparatus and a second apparatus. The first apparatus corresponds to the aforementioned information processing apparatus according to the present invention. The second apparatus corresponds to the aforementioned first other apparatus. The second apparatus includes a determining unit that performs the predefined determination on the determination target by a method different from the determining unit of the first apparatus in response to receiving the first request from the requesting unit, and transmits the result of the predefined determination to the first apparatus.

A control method according to the present invention is executed by a computer. The control method includes 1) a determining step of computing determination accuracy representing a probability that it is correct to use a first result as a result of a predefined determination on a determination target, and performing the predefined determination on the determination target based on the computed determination accuracy. In the determining step, the first evaluation being output as the result of the predefined determination in a case where the determination accuracy is greater than a first threshold value, and a second result being output as the result of the predefined determination in a case where the determination accuracy is smaller than a second threshold value (the first threshold value>the second threshold value).

The control method includes 2) a requesting step of transmitting a first request for requesting the predefined determination on the determination target to a first other apparatus in a case where the determination accuracy is equal to or greater than the second threshold value and is equal to or smaller than the first threshold value, and 3) an updating step of updating at least one of the first threshold value and the second threshold value based on the result of the predefined determination performed by the first other apparatus.

The first other apparatus performs the predefined determination by a method different in the determining step.

A program according to the present invention causes a computer to execute the steps of the control method according to the present invention.

Advantageous Effects of Invention

According to the present invention, a new technology for performing a determination on data as a determination target is provided.

BRIEF DESCRIPTION OF THE DRAWINGS

The aforementioned object and other objects, features, and advantages will be further apparent by preferred example embodiments to be described below and the following drawings attached thereto.

DESCRIPTION OF EMBODIMENTS

Hereinafter, example embodiments according to the present invention will be described with reference to the drawings. In all the drawings, the same reference signs are given to the same components, and the description will not be appropriately repeated. Unless otherwise specified, in each block diagram, each block represents not a configuration of a hardware unit but a configuration of a functional unit.

Example Embodiment 1

<Outline>

Figure 1:
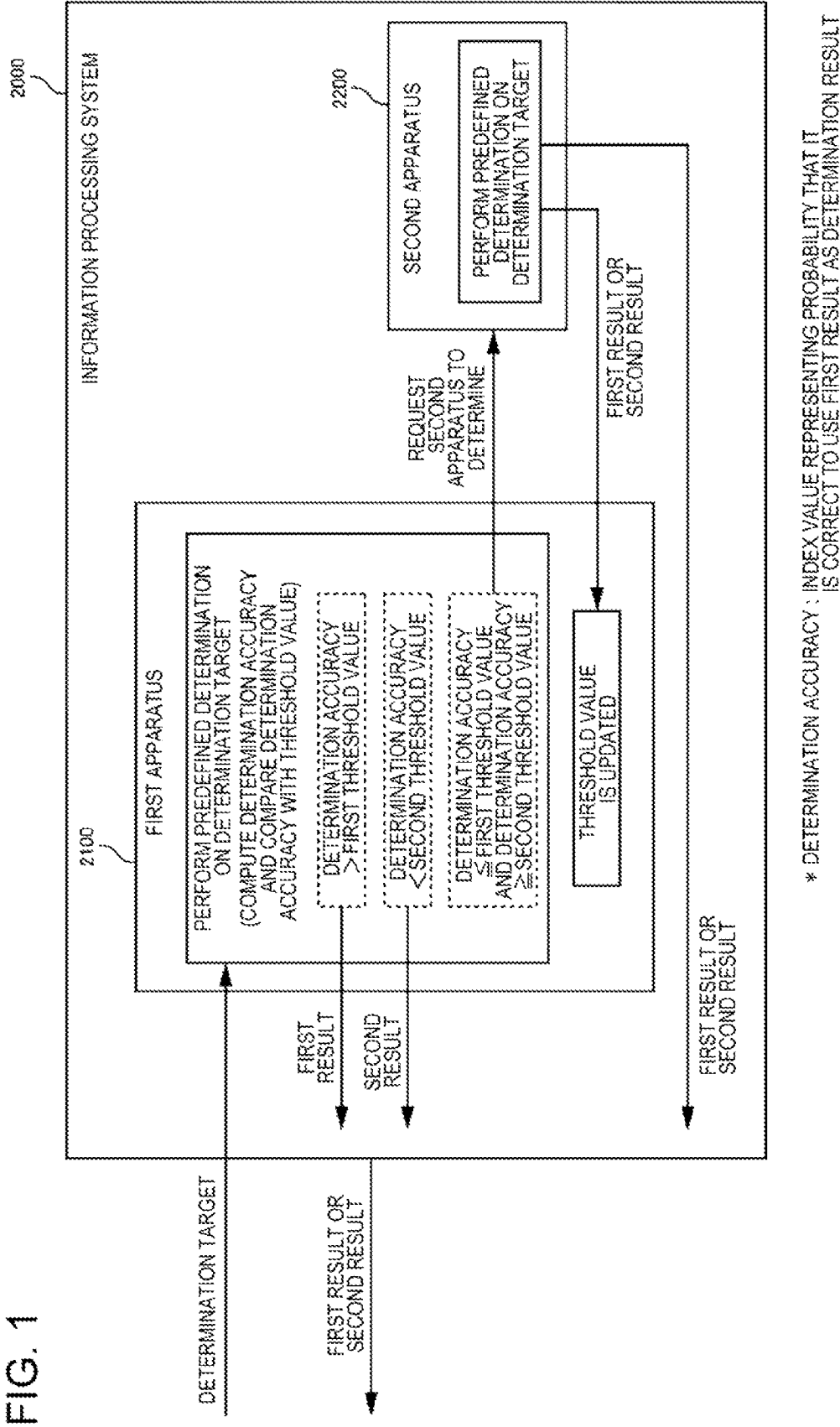
FIG. 1 illustrates a diagram for describing an outline of an operation of an information processing system according to Example Embodiment 1.

FIG. 1 is a diagram for describing an outline of an operation of an information processing system 2000 according to Example Embodiment 1. The operation of the information processing system 2000 to be described below is an example for facilitating the understanding of the information processing system 2000, and the operation of the information processing system 2000 is not limited to the following example. Details and variations of the operation of the information processing system 2000 will be described below.

The information processing system 2000 is a system that performs a predefined determination on a determination target. There are various determination targets and predefined determinations to be adopted. For example, the determination target is a surveillance video generated by a surveillance camera. In this case, the predefined determination is, for example, a determination of whether or not a specific person (such as a wanted criminal) is included in the surveillance video.

The information processing system 2000 includes a first apparatus 2100 and a second apparatus 2200. The first apparatus 2100 and the second apparatus 2200 perform the predefined determination on the determination target by different methods. The information processing system 2000 performs an operation such that "the first apparatus 2100 performs the predefined determination first and the second apparatus 2200 also performs the predefined determination as necessary" on the determination target. For example, the reason why such an operation is performed is that "the second apparatus 2200 can perform the predefined determination with higher accuracy than the first apparatus 2100 while the second apparatus 2200 takes a longer time to perform the predefined determination than the first apparatus 2100". However, the reason why the information processing system 2000 performs the aforementioned operation is any reason, and is not limited to the illustrated reason.

The information processing system 2000 performs the predefined determination on the determination target, and outputs any one of a first result or a second result as a determination result. For example, in a case where the predefined determination of "whether or not the wanted criminal is included in the surveillance video", the information processing system 2000 outputs either one of "included" or "not included". For example, in this case, "included" is the first result, and "not included" is the second result.

The first apparatus 2100 performs the predefined determination on the determination target. To do so, the first apparatus 2100 computes an index value (hereinafter, determination accuracy) representing a probability that it is correct to use the first result as the determination result. For example, it is assumed that the predefined determination performed by first apparatus 2100 is processing for determining whether or not the wanted criminal is included in the surveillance video. It is assumed that "included" is the first result. It is assumed that the predefined determination performed by the first apparatus 2100 is performed by using a determination model of "computing a degree of similarity between a face of a person included in the surveillance video and a face of the wanted criminal by using a predefined algorithm and outputting the degree of similarity". In this case, for example, the first apparatus 2100 computes, as the determination accuracy, the degree of similarity output by the determination model.

The first apparatus 2100 compares the determination accuracy with a first threshold value or a second threshold value. Specifically, the first apparatus 2100 outputs the first result as the determination result in a case where the determination accuracy is greater than the first threshold value. The first apparatus 2100 outputs the second result as the determination result in a case where the determination accuracy is smaller than the second threshold value. Here, the second threshold value is a value smaller than the first threshold value. In a case where the determination accuracy is equal to or greater than the second threshold value and is equal to or smaller than the first threshold value, the first apparatus 2100 requests the second apparatus 2200 to perform the predefined determination on the determination target.

For example, it is assumed that the determination of whether or not the wanted criminal is included in the surveillance video is performed by using the determination model of "computing the degree of similarity between the face of the person included in the surveillance video and the face of the wanted criminal by using the predefined algorithm and outputting the degree of similarity". In a case where the degree of similarity output by the determination model is greater than the first threshold value, the first apparatus 2100 outputs the first result representing that the wanted criminal is included in the surveillance video. In a case where the degree of similarity output by the determination model is smaller than the second threshold value, the first apparatus 2100 outputs the second result representing that the wanted criminal is not included in the surveillance video. In a case where the degree of similarity output by the determination model is equal to or greater than the second threshold value and is equal to or smaller than the first threshold value, the first apparatus 2100 requests the second apparatus 2200 to perform the predefined determination.

The second apparatus 2200 performs the predefined determination on the determination target according to the request from the first apparatus 2100, and outputs either one of the first result or the second result. For example, the second apparatus 2200 determines whether or not the wanted criminal is included in the surveillance video by using a determination model different from the determination model used by the first apparatus 2100.

In a case where evaluation is performed by the second apparatus 2200, a result of the evaluation performed by the information processing system 2000 is an evaluation result output by the second apparatus 2200. On the other hand, in a case where the evaluation is not performed by the second apparatus 2200, the result of the evaluation by the information processing system 2000 is the evaluation result output by the first apparatus 2100.

The result of the determination performed by the second apparatus 2200 is used for updating at least one of the first threshold value and the second threshold value. The first apparatus 2100 updates at least one of the first threshold value and the second threshold value based on the determination result output by the second apparatus 2200. The first apparatus 2100 may update the first threshold value or the second threshold value whenever the predefined determination is performed by the second apparatus 2200, or may update the first threshold value or the second threshold value based on the plural results of the predefined determinations performed by the second apparatus 2200.

<Advantageous Effects>

The first apparatus 2100 computes the determination accuracy which is the index value representing the probability that it is correct to use the first result as the determination result in order to perform the predefined determination on the determination target. In a case where the determination accuracy is sufficiently large (that is, in a case where the determination accuracy is greater than the first threshold value), the first result can be output as a determination result with sufficiently high reliability. In a case where the determination accuracy is sufficiently small (that is, in a case where the determination accuracy is smaller than the second threshold value), the second result can be output as a determination result with sufficiently high reliability.

However, in a case where the determination accuracy is not sufficiently large and is not sufficiently small (that is, in a case where the determination accuracy is equal to or greater than the second threshold value and is equal to or smaller than the first threshold value), there is a possibility that the reliability of the determination result is not sufficient only by the determination performed by the first apparatus 2100. Therefore, in such a case, the information processing system 2000 causes the second apparatus 2200 to perform the predefined determination on the determination target, and outputs the determination result as the result of the determination performed by the information processing system 2000.

As described above, in the information processing system 2000, the result of the determination performed by the first apparatus 2100 is output in a case where the reliability of the result of the determination performed by the first apparatus 2100 is sufficient, and the result of the determination performed by the second apparatus 2200 is output in a case where there is a possibility that the reliability of the result of the determination performed by the first apparatus 2100 is not sufficient. By doing so, it is possible to output a highly reliable determination result from the information processing system 2000 while reducing occasions to use the second apparatus 2200 in the information processing system 2000. Therefore, it is possible to increase the reliability of the result of the predefined determination performed by the information processing system 2000 while shortening a time required for the predefined determination performed by the information processing system 2000 and reducing the amount of computer resources used by the information processing system 2000.

The first apparatus 2100 according to the present example embodiment updates at least one of the first threshold value and the second threshold value based on the determination result output by the second apparatus 2200. Here, it can be said that the first threshold value and the second threshold value are threshold values for deciding "a numerical range of the determination accuracy in which the result of the determination performed by the first apparatus 2100 is considered to be highly reliable". Specifically, in the entire numerical range of the determination accuracy, a numerical range greater than the first threshold value and a numerical range smaller than the second threshold value are the numerical ranges indicating that the result of the determination performed by the first apparatus 2100 is highly reliable.

As described above, the second apparatus 2200 performs the predefined determination with higher accuracy than the first apparatus 2100. Therefore, the information processing system 2000 verifies the reliability of the result of the predefined determination performed by the first apparatus 2100 by using the result of the predefined determination performed by the second apparatus 2200, and updates the numerical range of the determination accuracy indicating that the predefined determination performed by the first apparatus 2100 is highly reliable according to the verification result. Due to this update, it is possible to reduce the occasions to use the second apparatus 2200 while maintaining the reliability of the result of the predefined determination performed by the information processing system 2000 by appropriately expanding the numerical range of the determination accuracy indicating that the predefined determination performed by the first apparatus 2100 is highly reliable. That is, it is possible to reduce the time required for the predefined determination performed by the information processing system 2000 and the amount of computer resources used by the information processing system 2000 while maintaining the reliability of the result of the predefined determination performed by the information processing system 2000.

Hereinafter, the information processing system 2000 according to the present example embodiment will be described in more detail.

<Example of Functional Configuration of Information Processing System 2000>

Figure 2:
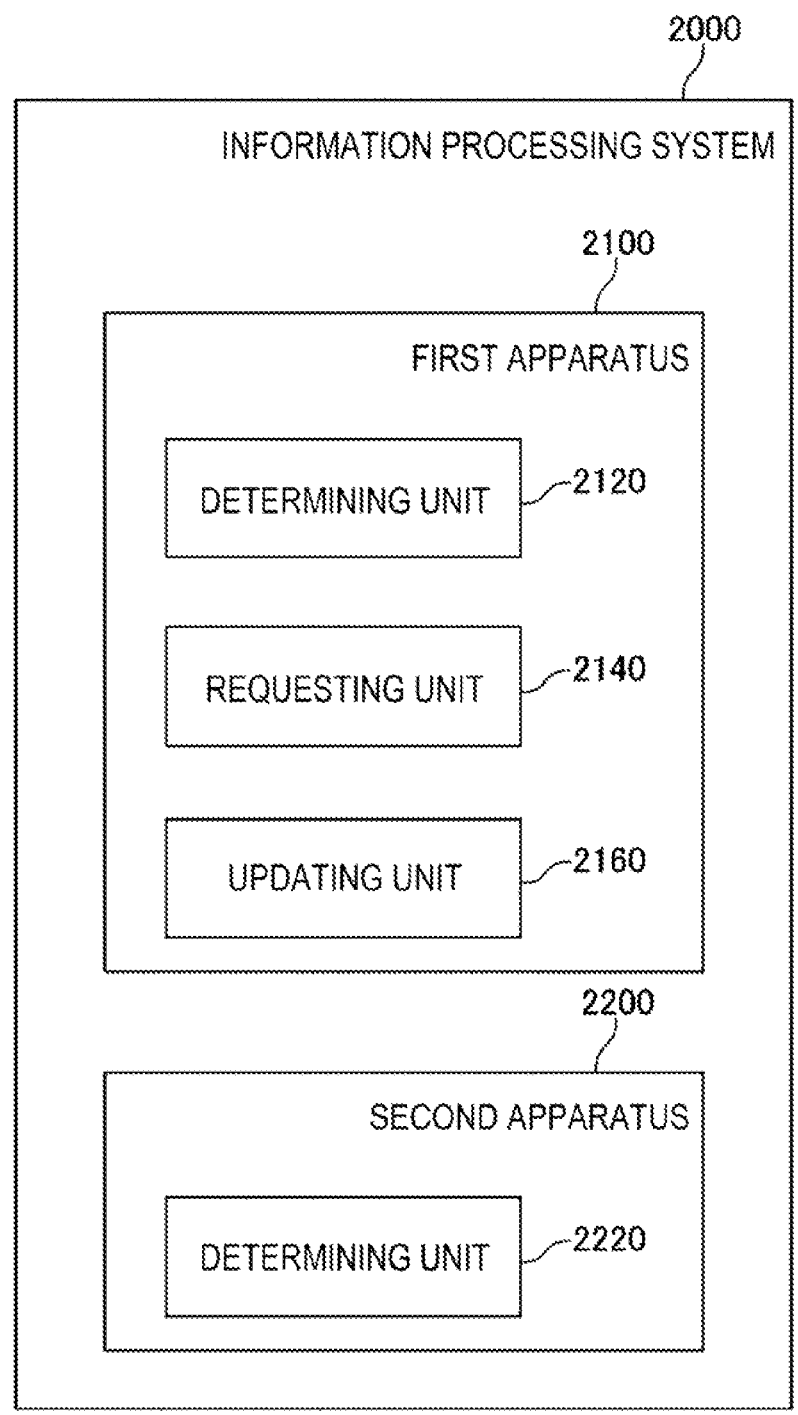
FIG. 2 is a diagram illustrating a functional configuration of the information processing system according to Example Embodiment 1.

FIG. 2 is a diagram illustrating a functional configuration of the information processing system 2000 according to Example Embodiment 1. The information processing system 2000 includes the first apparatus 2100 and the second apparatus 2200. The first apparatus 2100 includes a determining unit 2120, a requesting unit 2140, and an updating unit 2160. The determining unit 2120 performs the predefined determination by computing the determination accuracy for the determination target. As described above, in a case where the determination accuracy is greater than the first threshold value, the first result is handled as the determination result. In a case where the determination accuracy is smaller than the second threshold value, the second result is handled as the determination result. Here, the second threshold value is smaller than the first threshold value. In a case where the determination accuracy is equal to or greater than the second threshold value and is equal to or smaller than the first threshold value, the requesting unit 2140 transmits a first request for requesting the predefined determination on the determination target to the second apparatus 2200. The updating unit 2160 updates at least one of the first threshold value and the second threshold value based on the result of the determination performed by the second apparatus 2200.

The second apparatus 2200 includes a determining unit 2220. The determining unit 2220 performs the predefined determination on the determination target according to the request from the requesting unit 2140, and outputs the determination result.

Here, the information processing system 2000 may include a plurality of first apparatuses 2100 and a plurality of second apparatuses 2200. In this case, a correspondence between the first apparatus 2100 and the second apparatus 2200 may be one-to-one, one-to-many, or many-to-one. In a case where the correspondence between the first apparatus 2100 and the second apparatus 2200 is one-to-one or many-to-one, the second apparatus 2200 that can be a destination of the first request by the first apparatus 2100 is only one second apparatus 2200 associated in advance among a plurality of second apparatuses 2200. On the other hand, in a case where the correspondence between the first apparatus 2100 and the second apparatus 2200 is one-to-many, the first apparatus 2100 sets a transmission destination of the first request as one of the plurality of associated second apparatuses 2200.

Figure 3:
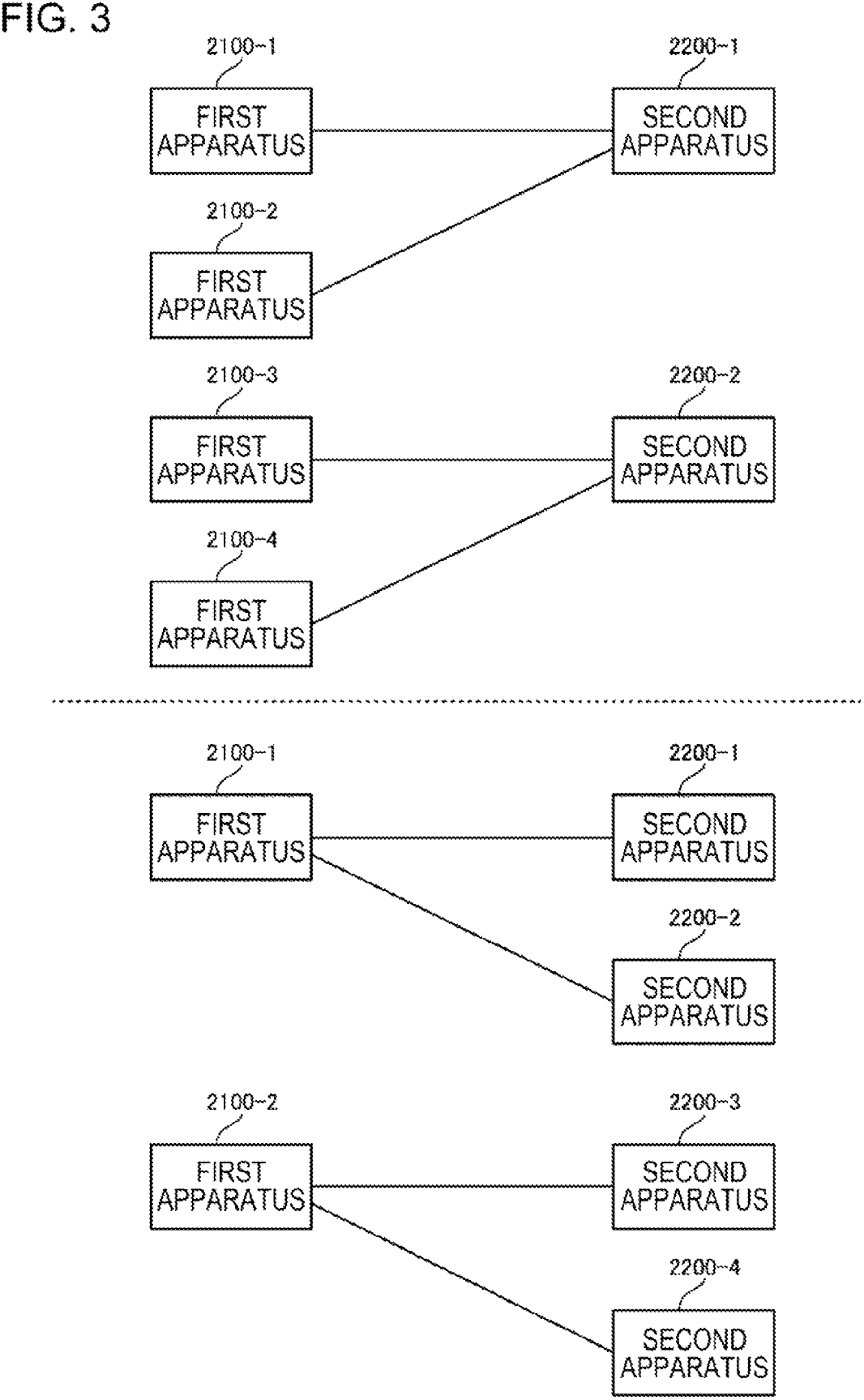
FIG. 3 is a diagram illustrating a correspondence between a first apparatus and a second apparatus.

FIG. 3 is a diagram illustrating the correspondence between the first apparatus 2100 and the second apparatus 2200. In an example at an upper part of FIG. 3, the first apparatus 2100 and the second apparatus 2200 are in a many-to-one correspondence. For example, a first apparatus 2100-1 can transmit the first request only to a second apparatus 2200-1 among the plurality of second apparatuses 2200. As described above, the same applies to a case where the correspondence between the first apparatus 2100 and the second apparatus 2200 is one-to-one (not illustrated).

On the other hand, in an example at a lower part of FIG. 3, the first apparatus 2100 and the second apparatus 2200 are in a one-to-many correspondence. For example, the first apparatus 2100-1 may transmit the first request to any one of the second apparatus 2200-1 or a second apparatus 2200-2.

<Hardware Configuration of First Apparatus 2100>

Each functional component of the first apparatus 2100 may be realized by hardware (for example: hard-wired electronic circuit) that realizes each functional component, or may be realized by a combination of hardware and software (for example: a combination of an electronic circuit and a program for controlling the electronic circuit). Hereinafter, a case where each functional component of the first apparatus 2100 is realized by a combination of hardware and software will be further described.

Figure 4:
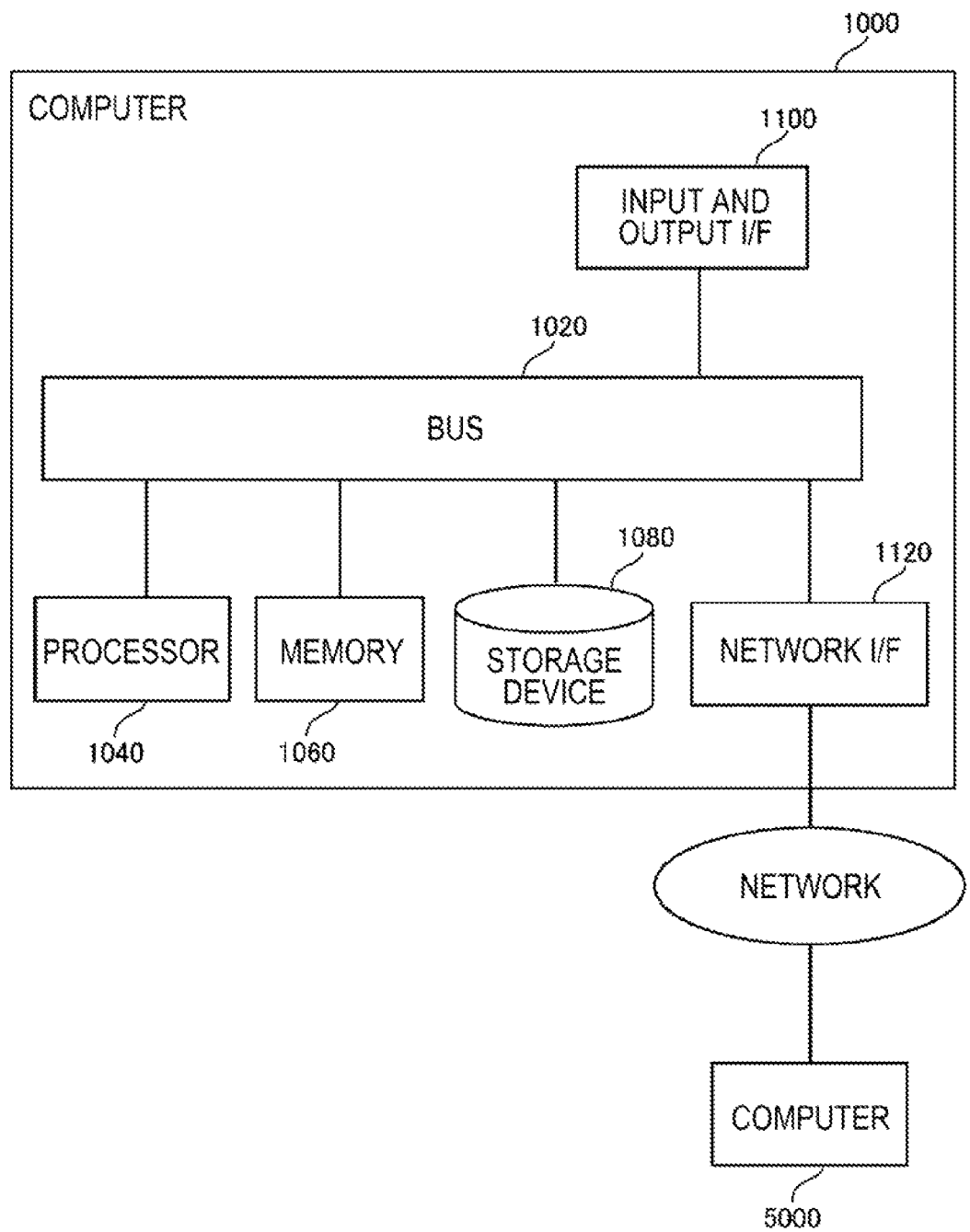
FIG. 4 is a diagram illustrating a computer that realizes the first apparatus.

FIG. 4 is a diagram illustrating a computer 1000 for realizing the first apparatus 2100. The computer 1000 is any computer. For example, the computer 1000 is a Personal Computer (PC), a server machine, a tablet terminal, or a smartphone. For example, the computer 1000 may be a computer built in a camera that generates the aforementioned surveillance video. The computer 1000 may be a dedicated computer designed for realizing the first apparatus 2100 or a general-purpose computer.

The computer 1000 includes a bus 1020, a processor 1040, a memory 1060, a storage device 1080, an input and output interface 1100, and a network interface 1120. The bus 1020 is a data transmission path through which the processor 1040, the memory 1060, the storage device 1080, the input and output interface 1100, and the network interface 1120 transmit and receive data to and from each other. However, the method of connecting the processor 1040 and the like is not limited to the bus connection. The processor 1040 is various processors such as a Central Processing Unit (CPU) and a Graphics Processing Unit (GPU). The memory 1060 is a main storage device realized by using a Random Access Memory (RAM). The storage device 1080 is an auxiliary storage device realized by using a hard disk, a Solid State Drive (SSD), a memory card, or a Read Only Memory (ROM). However, the storage device 1080 may be constituted by the same hardware as hardware constituting a main storage device such as an RAM.

The input and output interface 1100 is an interface for connecting the computer 1000 and input and output devices. For example, the input device such as a keyboard and the output device such as a display device are connected to the input and output interface 1100.

The network interface 1120 is an interface for connecting the computer 1000 to a network. This communication network is, for example, a Local Area Network (LAN) or a Wide Area Network (WAN). The method by which the network interface 1120 connects the computer to the network may be a wireless connection or a wired connection. The computer 1000 that realizes the first apparatus 2100 is connected to a computer (computer 5000 to be described below) that realizes the second apparatus 2200 via a network.

The storage device 1080 stores a program module that realizes each functional component of the first apparatus 2100. The processor 1040 realizes a function corresponding to each program module by reading each program module into the memory 1060 and executing the program module. The first threshold value and the second threshold value are stored in the storage device 1080.

<Hardware Configuration of Second Apparatus 2200>

Each functional component of the second apparatus 2200 may be realized by hardware (for example: hard-wired electronic circuit) that realizes each functional component, or may be realized by a combination of hardware and software (for example: a combination of an electronic circuit and a program for controlling the electronic circuit). Hereinafter, a case where each functional component of the second apparatus 2200 is realized by a combination of hardware and software will be further described.

Figure 5:
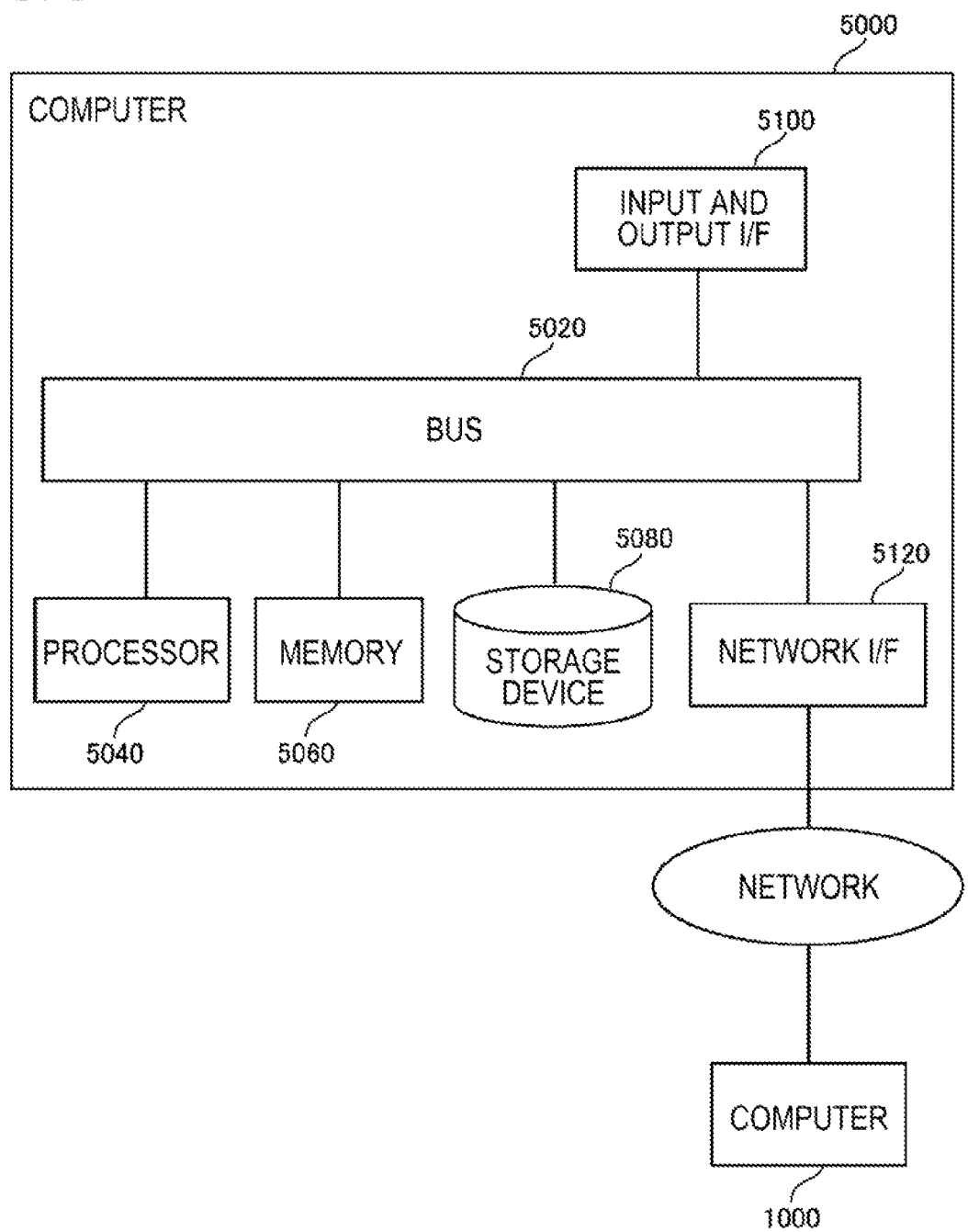
FIG. 5 is a diagram illustrating a computer that realizes the second apparatus.

FIG. 5 is a diagram illustrating a computer 5000 for realizing the second apparatus 2200. The computer 5000 is any computer. For example, the computer 5000 is a Personal Computer (PC), a server machine, a tablet terminal, or a smartphone. The computer 5000 may be a dedicated computer designed for realizing the second apparatus 2200 or a general-purpose computer.

The computer 5000 includes a bus 5020, a processor 5040, a memory 5060, a storage device 5080, an input and output interface 5100, and a network interface 5120. The bus 5020, the processor 5040, the memory 5060, the storage device 5080, the input and output interface 5100, and the network interface 5120 are the same as the bus 1020, the processor 1040, the memory 1060, the storage device 1080, the input and output interface 1100, and the network interface 1120.

However, a program module for realizing the second apparatus 2200 is stored in the storage device 5080. For example, as described above, the first apparatus 2100 and the second apparatus 2200 perform the predefined determination by different methods. Thus, the program module (the program module that realizes the determining unit 2220) which is stored in the storage device 5080 and is used for the predefined determination is different from the program module (the program module that realizes the evaluation of the index value performed by the requesting unit 2140) which is stored in the storage device 1080 and is used for the predefined determination.

<Specific Examples of First Apparatus 2100 and Second Apparatus 2200>

Figure 6:
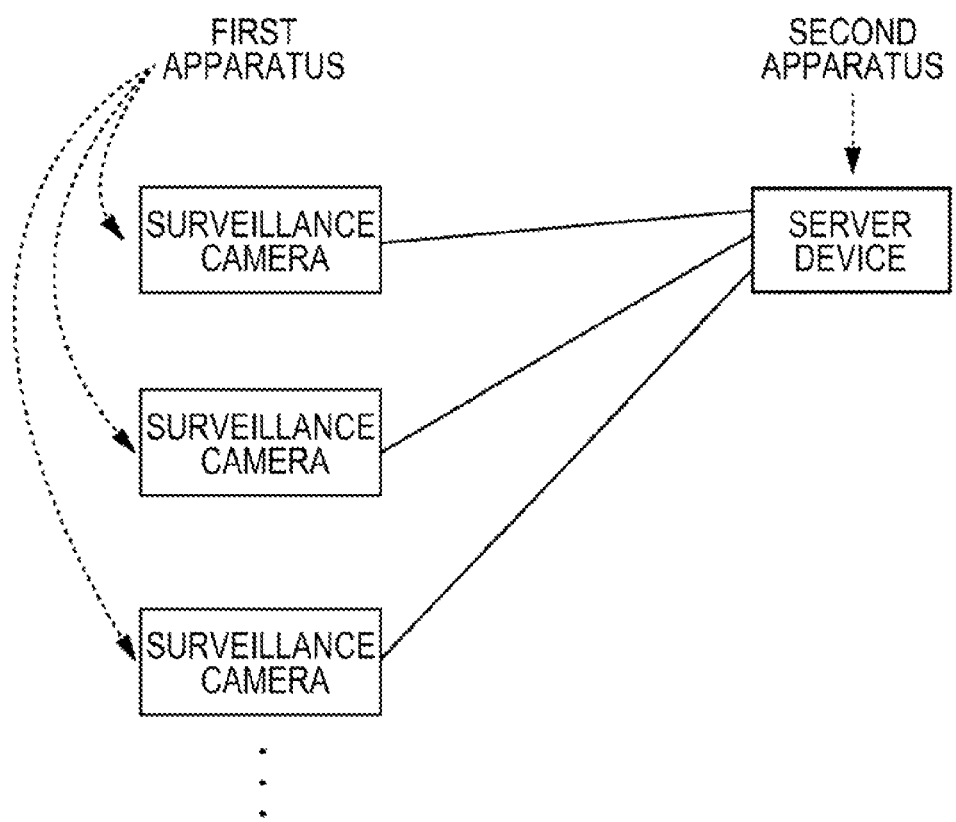
FIG. 6 is a diagram illustrating specific examples of the first apparatus and the second apparatus.

FIG. 6 is a diagram illustrating specific examples of the first apparatus 2100 and the second apparatus 2200. In FIG. 6, the first apparatus 2100 is a surveillance camera that captures a surveillance target and generates the surveillance video. The second apparatus 2200 is a server device connected so as to communicate with the surveillance camera. According to such a configuration, first, the surveillance camera itself performs the predefined determination on the surveillance video generated by the surveillance camera, for example. For example, it is determined whether or not the specific person is included in the surveillance video as described above. In a case where the surveillance camera itself that generates the surveillance video cannot perform the highly reliable determination (in a case where the determination accuracy is equal to or greater than the second threshold value and is equal to or smaller than the first threshold value), the predefined determination on the surveillance video is performed by the server device. By doing so, it is possible to increase the reliability of the determination result of the entire system while letting the surveillance camera itself process the surveillance video as much as possible.

Note that, the configuration illustrated in FIG. 6 is merely an example, and the first apparatus 2100 and the second apparatus 2200 are not limited to the camera and the server device. The determination target is not limited to the surveillance video.

<Flow of Processing>

Figure 7:
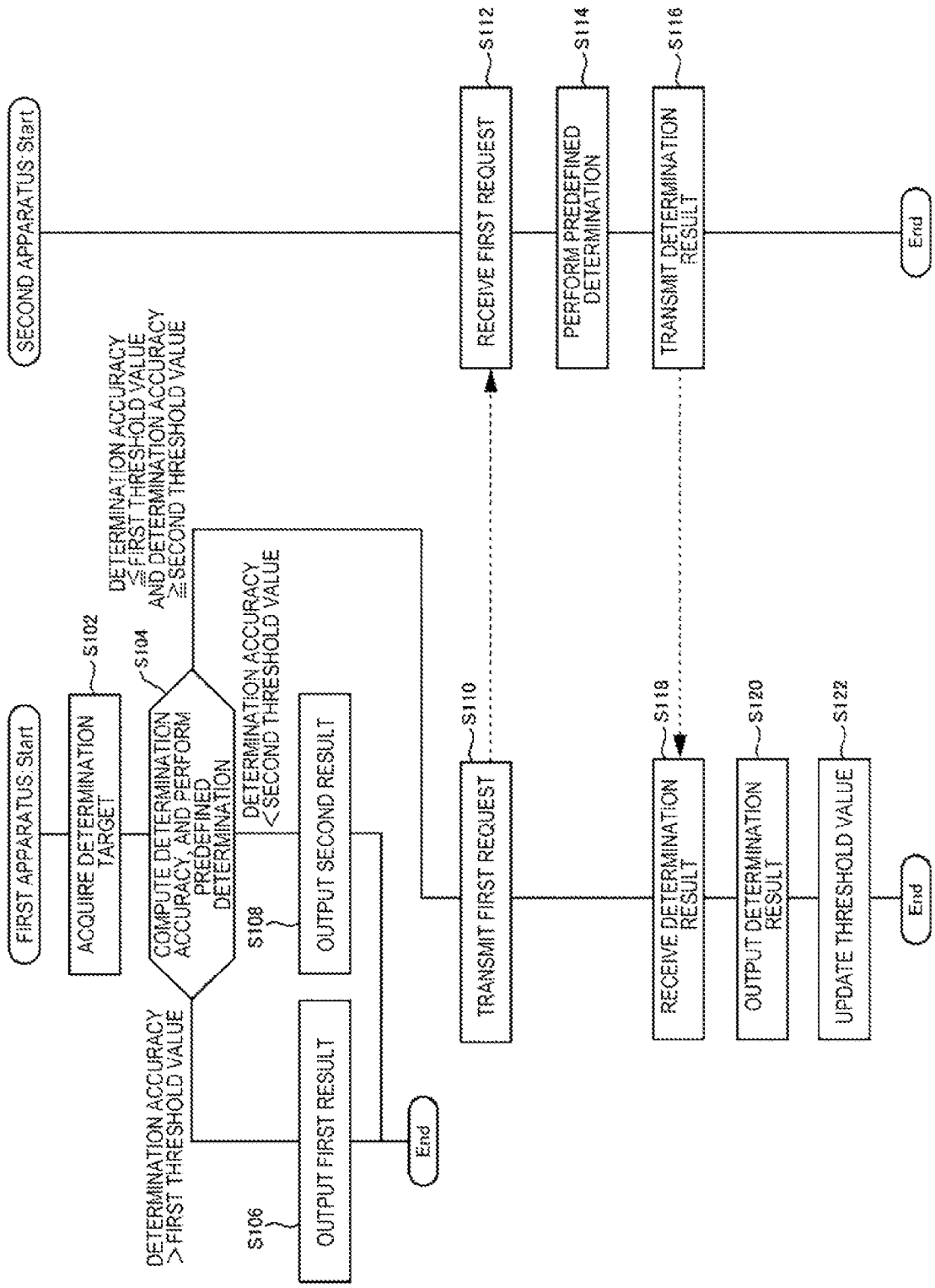
FIG. 7 is a flowchart illustrating a flow of processing performed by the first apparatus according to Example Embodiment 1.

FIG. 7 is a flowchart illustrating a flow of processing executed by the first apparatus 2100 according to Example Embodiment 1. The determining unit 2120 acquires the determination target (S102). The determining unit 2120 performs the predefined determination by computing the determination accuracy for the determination target (S104). In a case where the determination accuracy is greater than the first threshold value, the determining unit 2120 outputs the first result (S106). In a case where the determination accuracy is smaller than the second threshold value, the determining unit 2120 outputs the second result (S108). In a case where the index value is equal to or greater than the second threshold value and is equal to or smaller than the first threshold value, the requesting unit 2140 transmits the first request to the second apparatus 2200 (S110).

The determining unit 2220 receives the first request (S112). The determining unit 2220 performs the predefined determination on the determination target (S114). The determining unit 2220 transmits the determination result (S116).

The requesting unit 2140 receives the determination result (a response to the first request) from the second apparatus 2200 (S118). The requesting unit 2140 outputs the received determination result (S120). The updating unit 2160 updates at least one of the first threshold value and the second threshold value by using the result of the determination performed by the second apparatus 2200 (S122).

<Acquisition of Determination Target: S102>

The determining unit 2120 acquires the determination target (S102). Specifically, the determining unit 2120 acquires any data representing the determination target. Hereinafter, the data representing the determination target is referred to as determination target data. For example, in a case where the determination target is the aforementioned surveillance video, the determination target data is video data representing the surveillance video. The determining unit 2120 may acquire the determination target data by any method such as a method of accessing the storage device storing the determination target data and acquiring the determination target data or a method of receiving the determination target data transmitted from another apparatus.

<Determinations Performed by Determining Unit 2120 and Determining Unit 2220: S104, S114>

Both the determining unit 2120 and the determining unit 2220 perform the predefined determination on the determination target. Any determination may be handled as the predefined determination. For example, the predefined determination is the aforementioned determination of whether or not the specific person is included in the surveillance video. In another example, the predefined determination is a determination of whether or not a person who does suspicious behavior is included in the surveillance video.

The determining unit 2120 and the determining unit 2220 perform the predefined determinations by different methods. Here, the determining unit 2220 performs the predefined determination with higher accuracy than the determining unit 2120. For example, the determining unit 2120 and the determining unit 2220 perform the predefined determination by using different determination models. Various existing methods such as a method using machine learning, e.g. deep learning, may be used to configure the determination model. Hereinafter, the determination model used by the determining unit 2120 is referred to as a first model, and the determination model used by the determining unit 2220 is referred to as a second model.

For example, the determining unit 2220 uses the determination model with higher accuracy than the determination model used by the determining unit 2120. For example, it is assumed that both the first model and the second model are determination models using a neural network. In this case, the depth of a hierarchy of the neural network of the second model is greater than the depth of a hierarchy of the neural network of the first model. In another example, it is assumed that each of the first model and the second model is a determination model that extracts one or more feature values of an image region representing a person from the video. In this case, the number of feature values extracted by the second model is set to be greater than the number of feature values extracted by the first model.

Here, the first model computes the determination accuracy. The determination accuracy is an index value representing a probability that it is correct to use the first result as the determination result. For example, in terms of the predefined determination of "whether or not the specific person is included in the surveillance video", the determination accuracy representing the probability that it is correct to use the first result of "included" as the determination result is the degree of similarity between the person included in the surveillance video and the specific person. As stated above, various known models may be used as the determination model that outputs the accuracy of the determination result.

<Transmission of First Request: S110>

The requesting unit 2140 transmits the first request to the second apparatus 2200. The first request includes data that can determine the determination target. For example, the requesting unit 2140 includes the determination target data to the first request. In another example, the requesting unit 2140 may include information necessary for acquiring the determination target data in the first request, such as a name of a file representing the determination target data and a name of the storage device storing the determination target data. In the latter case, the second apparatus 2200 accesses the storage device storing the determination target data, and acquires the determination target data.

<Reception of Response to First Request: S118>

The first apparatus 2100 receives the response to the first request (S118). This response includes the determination result of the predefined determination performed by the second apparatus 2200. The received determination result is used for updating the first threshold value or the second threshold value. A specific method for updating these threshold values will be described later.

<Output of Determination Result: S106, S108, S120>

The result of the predefined determination performed by the information processing system 2000 is output by the first apparatus 2100 or the second apparatus 2200 (S106, S108, S120). In a case where the predefined determination is performed by the second apparatus 2200, the result of the predefined determination performed by the information processing system 2000 is the determination result output by the second apparatus 2200. On the other hand, in a case where the predefined determination is not performed by the second apparatus 2200, the result of the predefined determination performed by the information processing system 2000 is the determination result output by the first apparatus 2100.

Any method of outputting the result of the predefined determination performed by the information processing system 2000 is acceptable. For example, the result of the predefined determination performed by the information processing system 2000 is output to a device that requests the first apparatus 2100 to perform the predefined determination. In another example, the result of the determination performed by the information processing system 2000 may be output by using an output device such as a display device.

Here, in a case where the second apparatus 2200 performs the predefined determination, the determination result may be output by the first apparatus 2100 or may be output by the second apparatus 2200. In the former case, the first apparatus 2100 outputs the determination result received in S118.

<Updating of Threshold Value: S122>

The updating unit 2160 updates at least one of the first threshold value and the second threshold value by using the result of the evaluation performed by the second apparatus 2200 (S122). For example, the updating unit 2160 updates the first threshold value and the second threshold value by the following method.

Figure 8:
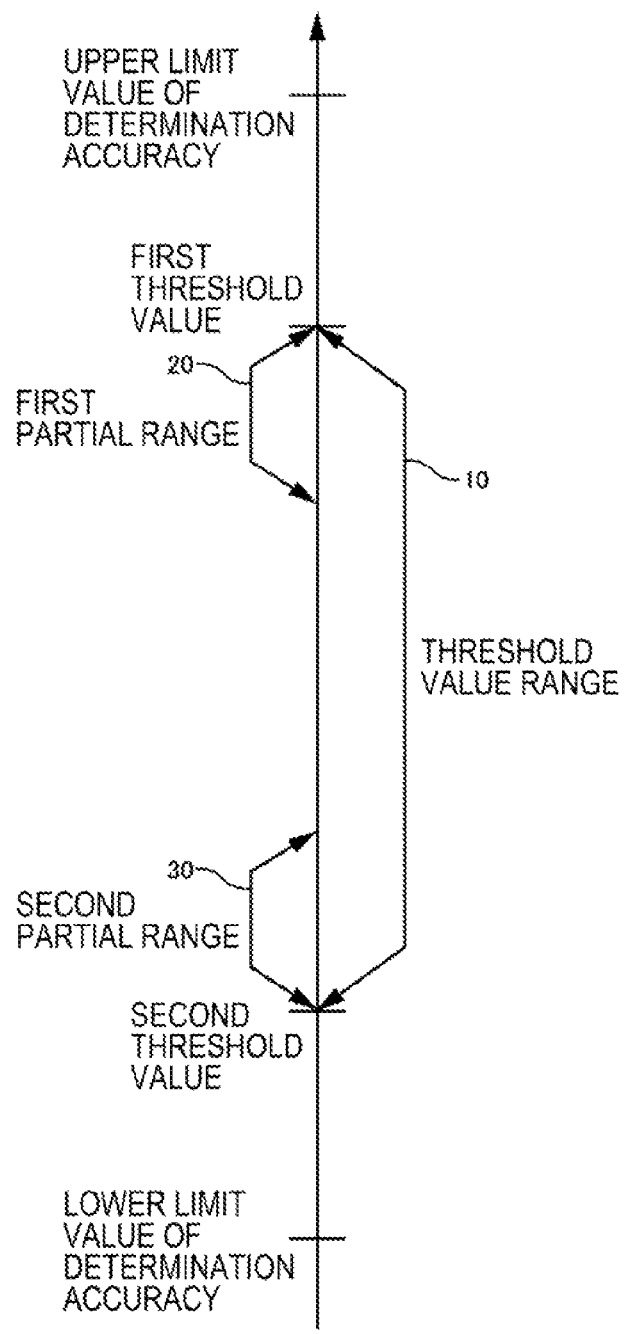
FIG. 8 is a diagram illustrating a partial range.

The updating unit 2160 decides a first partial range and a second partial range for a numerical range in which the second threshold value is a lower limit value and the first threshold value is an upper limit value (hereinafter, a threshold value range). The first partial range is a numerical range in which the upper limit value is equal to the first threshold value and the lower limit value is greater than the second threshold value. The second partial range is a numerical range in which the lower limit value is equal to the second threshold value and the upper limit value is smaller than the first threshold value. FIG. 8 is a diagram illustrating the partial ranges. In FIG. 8, regions denoted by reference signs 10, 20, and 30 represent a threshold value range, a first partial range, and a second partial range respectively. A specific method of deciding the first partial range 20 and the second partial range 30 will be described later.

The updating unit 2160 updates the threshold value using the first partial range 20 and the second partial range 30. For example, in a case where the determination accuracy is included in the first partial range 20 and the result of the determination performed by the second apparatus 2200 is the first result, the updating unit 2160 changes the first threshold value as a value equal to the lower limit value of the first partial range 20. By doing so, the first partial range 20 is added to the range of the determination accuracy in which the determination result performed by the first apparatus 2100 is the first result.

Similarly, in a case where the determination accuracy is included in the second partial range 30 and the result of the determination performed by the second apparatus 2200 is the second result, the updating unit 2160 changes the second threshold value as a value equal to the upper limit value of the second partial range 30. By doing so, the second partial range 30 is added to the range of the determination accuracy in which the determination result is the second result.

Figure 9:
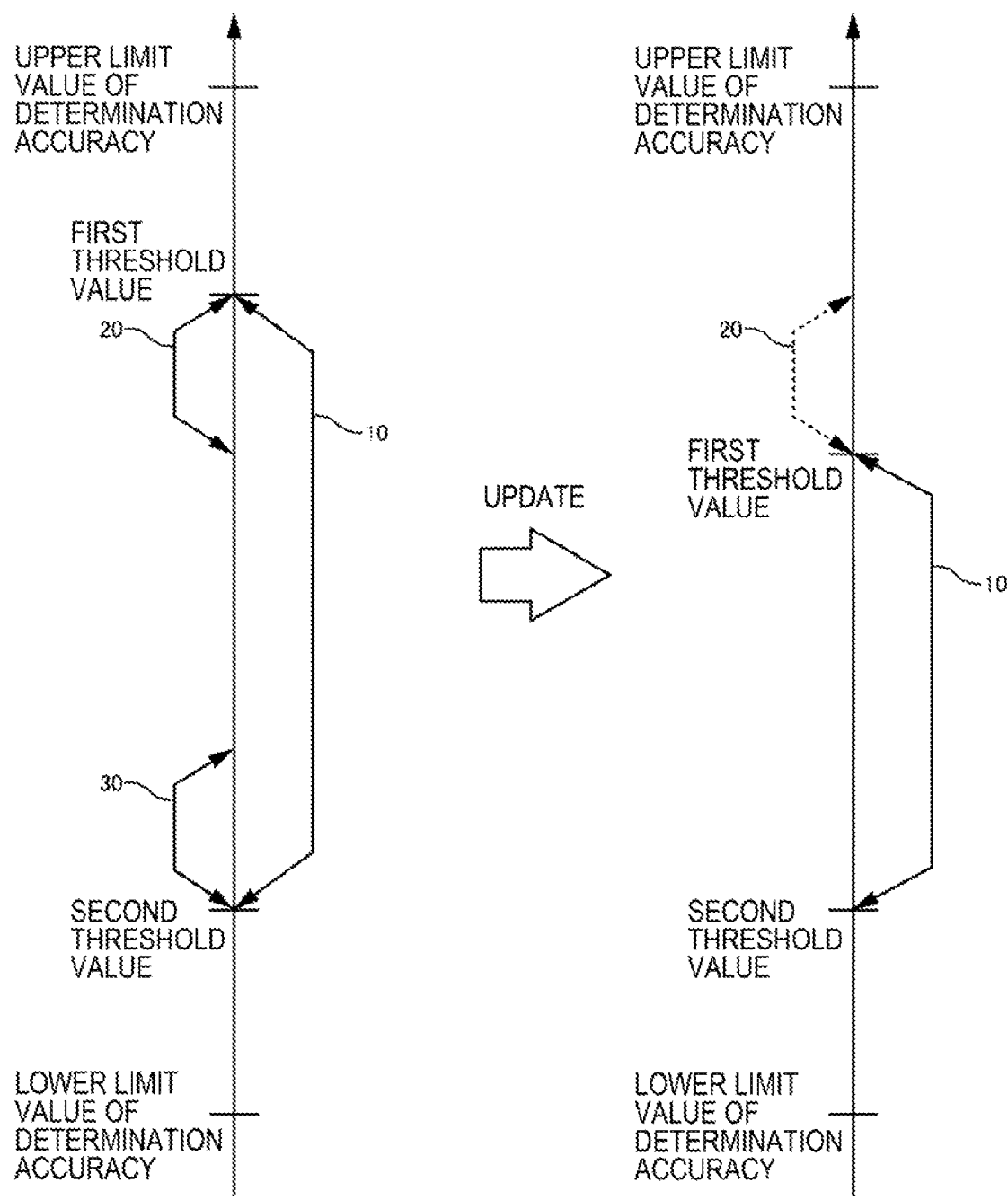
FIG. 9 is a first diagram illustrating updating of a threshold value.
Figure 10:
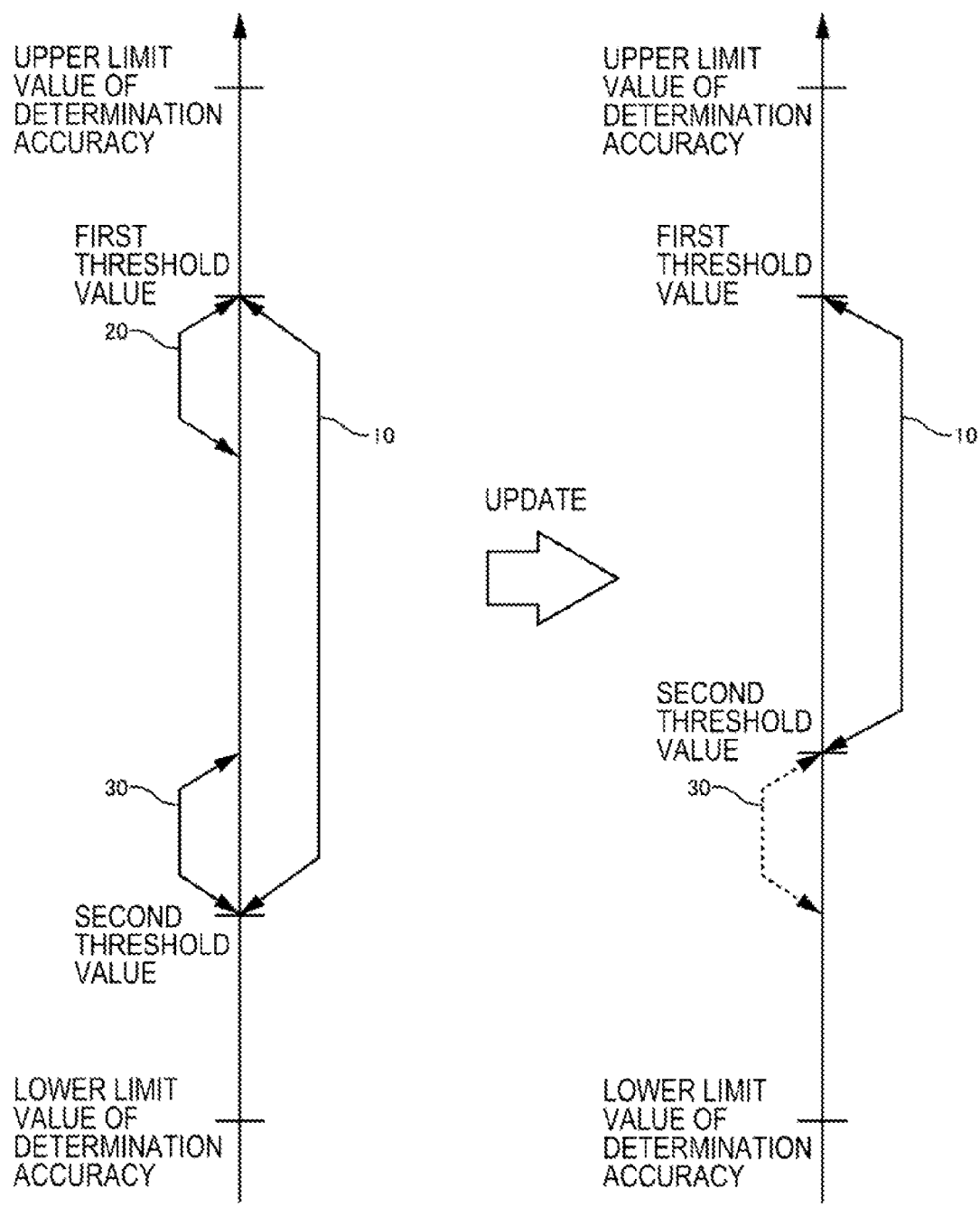
FIG. 10 is a second diagram illustrating the updating of the threshold value.

FIGS. 9 and 10 are diagrams illustrating examples in which the threshold value is updated. In the example of FIG. 9, the first threshold value is updated to the value equal to the lower limit value of the first partial range 20. On the other hand, in the example of FIG. 10, the second threshold value is changed to the value equal to the upper limit value of the second partial range 30.

In the aforementioned examples, the threshold values are updated based on the result of the predefined determination performed once. However, the updating unit 2160 may update the threshold values based on the results of the predefined determinations performed multiple times. For example, in a case where the determination accuracy is included in the first partial range 20 and the result of the determination performed by the second apparatus 2200 is the first result in the predefined determinations performed a predefined number of time or more, the updating unit 2160 changes the first threshold value as the value equal to the lower limit value of the first partial range 20. Similarly, in a case where the determination accuracy is included in the second partial range 30 and the result of the determination performed by the second apparatus 2200 is the second result in the predefined determinations performed a predefined number of times or more, the updating unit 2160 changes the second threshold value as the value equal to the upper limit value of the second partial range 30.

There are various methods of deciding the first partial range 20 and the second partial range 30. For example, the updating unit 2160 decides the first partial range 20 and the second partial range 30 by dividing the threshold value range 10 into n (n is an integer of 2 or more) regions. Specifically, the updating unit 2160 sets, as the first partial range 20, a region in which the upper limit value is the first threshold value among the regions obtained by dividing the threshold value range 10 into the n regions. The updating unit 2160 sets, as the second partial range 30, a region in which the lower limit value is the second threshold value among the regions obtained by dividing the threshold value range 10 into the n regions.

In another example, a ratio of a size of the first partial range 20 to a size of the threshold value range 10 and a ratio of a size of the second partial range 30 to a size of the threshold value range 10 are defined in advance. The updating unit 2160 computes the first partial range 20 and the second partial range 30 by using the ratios defined in advance.

For example, both the ratio of the size of the first partial range 20 to the size of the threshold value range 10 and the ratio of the size of the second partial range 30 to the size of the threshold value range 10 are defined as 10%. In this case, the first partial range 20 is a numerical range whose upper limit value is equal to the first threshold value and whose size is 10% of the size of the threshold value range 10. The second partial range 30 is a numerical range whose lower limit value is equal to the second threshold value and whose size is 10% of the size of the threshold value range 10. Note that, the sizes of the first partial range 20 and the second partial range 30 may be different from each other.

The updating unit 2160 updates the threshold value at various timings. For example, after the threshold value is updated, the updating unit 2160 updates the threshold value again in a case where the second apparatus 2200 performs the predefined determination the predefined number of times or more. In another example, in a case where a predefined time elapses after the threshold value is updated, the updating unit 2160 updates the threshold value again (that is, the threshold values are periodically updated).

<Updating of Determination Model>

The information processing system 2000 may have a function of updating the first model used by the determining unit 2020 and the second model used by the determining unit 2220. For example, the determination target data as a target of the predefined determination performed by the information processing system 2000 is accumulated in the storage device, training data is generated by using the accumulated determination target data, and the first model and the second model are updated by using the generated training data. The training data is represented by a combination of "determination target data and a correct answer of determination result". Here, an existing technology may be used as the technology for updating the determination model by using the training data.

For example, the correct answer of determination result for the determination target data is manually generated. In another example, the training data may be generated by preparing a third apparatus including a third model that performs a predefined determination with higher accuracy than the second model and performing the predefined determination on the accumulated determination target data by using the third model. In this case, the correct answer of determination result is the determination result output by the third model.

Example Embodiment 2

Figure 11:
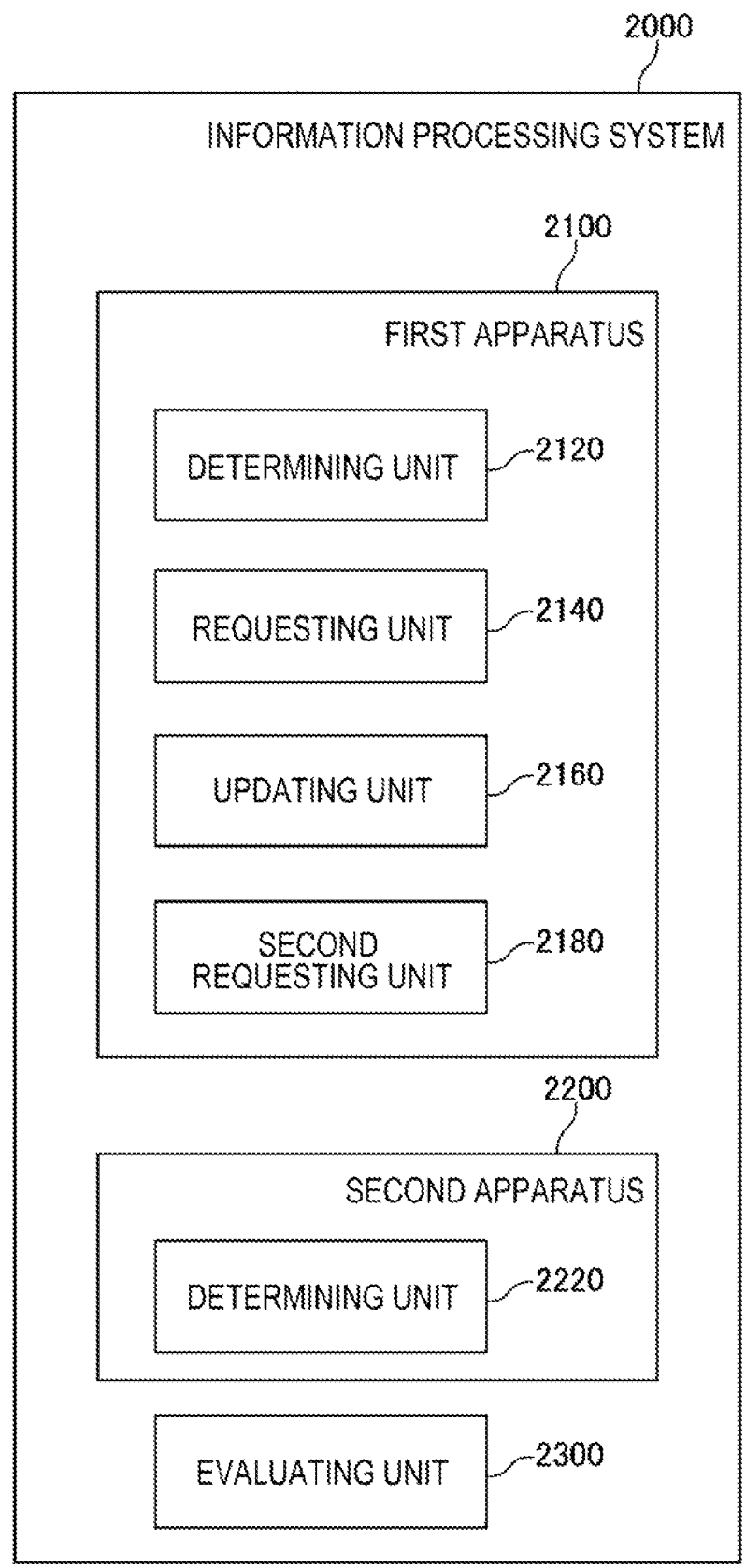
FIG. 11 is a diagram illustrating a functional configuration of an information processing system according to Example Embodiment 2.

FIG. 11 is a diagram illustrating a functional configuration of the information processing system 2000 according to Example Embodiment 2. The information processing system 2000 according to Example Embodiment 2 has the same functions as those of the information processing system 2000 according to Example Embodiment 1 except for the points to be described below.

The information processing system 2000 according to Example Embodiment 2 has a function of evaluating validity of the updating of the threshold value performed by the first apparatus 2100. To do so, the first apparatus 2100 includes a second requesting unit 2180. The second requesting unit 2180 transmits a request for requesting evaluation of the validity of the updating of the first threshold value or the second threshold value performed by the updating unit 2160 (hereinafter, referred to as a second request).

The information processing system 2000 includes an evaluating unit 2300 that evaluates the validity. The evaluating unit 2300 may be included in the second apparatus 2200 or may be included in an apparatus other than the second apparatus 2200. In the latter case, the information processing system 2000 includes a third apparatus including the evaluating unit 2300 in addition to the first apparatus 2100 and the second apparatus 2200. In the following example, the description will be made on the assumption that the second apparatus 2200 including the evaluating unit 2300.

<Evaluation Performed by Evaluating Unit 2300>

The evaluating unit 2300 verifies the validity of the updating of the threshold value by causing the determining unit 2120 to perform the predefined determination on the determination target handled by the determining unit 2120 after the threshold value is updated and comparing the determination results output from the determining unit 2120. This method will be specifically described below.

The evaluating unit 2300 acquires the determination target data representing each of the plurality of determination targets handled by the determining unit 2120 after the threshold value is updated. The evaluating unit 2300 also acquires the determination result output by the determining unit 2120 for the determination target data in association with each determination target data. That is, the evaluating unit 2300 acquires a plurality of combinations of "determination target data and determination result output by the determining unit 2120". Hereinafter, data representing this combination is referred to as evaluation data.

The evaluating unit 2300 causes the second apparatus 2200 to perform the predefined determination on each determination target data included in the acquired evaluation data. By doing so, the evaluating unit 2300 acquires the determination result output from each of the determining unit 2120 and the second apparatus 2200 for each determination target data.

The evaluating unit 2300 evaluates the validity of the updating of the threshold value based on a degree of coincidence between the determination result output from the determining unit 2120 and the determination result output from the determining unit 2220. For example, in a case where the determining unit 2120 and the determining unit 2220 output the same determination result for all the acquired determination target data, the evaluating unit 2300 determines that the updating of the threshold value is valid. On the other hand, in a case where the determining unit 2120 and the determining unit 2220 output different determination results for any of the determination target data, the evaluating unit 2300 determines that the updating of the threshold value is not valid.

In another example, in a case where the determining unit 2120 and the determining unit 2220 output the same determination result for a predefined ratio of the determination data among the acquired determination target data, the evaluating unit 2300 determines that the updating of the threshold value is valid. On the other hand, in a case where the ratio of the determination data for which the determining unit 2120 and the determining unit 2220 output the same determination result is smaller than a predefined ratio, the evaluating unit 2300 determines that the updating of the threshold value is not valid. In this case, a certain extent of error is permitted to be included in the determination performed by the determining unit 2120.

In order to perform the aforementioned determination, the evaluating unit 2300 acquires the evaluation data from the first apparatus 2100. To do so, in a case where the predefined determination is performed on the determination target after the threshold value is updated, the determining unit 2120 generates the evaluation data by using the determination result, and puts the generated evaluation data into the storage device. The second requesting unit 2180 adds the plurality of evaluation data stored in the storage device to the second request, and transmits the evaluation data to the evaluating unit 2300.

Note that, the evaluating unit 2300 may be included in an apparatus other than the second apparatus 2200 as described above. In this case, similarly to the determining unit 2220, a determining unit that can perform a predefined determination with higher accuracy than the determining unit 2120 is provided in the apparatus including the evaluating unit 2300. The evaluating unit 2300 evaluates the validity of the updating of the threshold value by comparing the result of the determination performed by this determining unit with the result of the determination performed by the determining unit 2120 by the same method as the aforementioned method.

<Updating of Threshold Value Based on Evaluation Performed by Evaluating Unit 2300>

The updating unit 2160 updates the threshold value based on the result of the evaluation performed by the evaluating unit 2300. For example, in a case where the result of the evaluation performed by the evaluating unit 2300 indicates that the updating of the threshold value is not valid, the updating unit 2160 restores this threshold value to the before-updated value. For example, it is assumed that the result of the evaluation performed by the evaluating unit 2300 indicates that the updating of the first threshold value is not valid. In this case, the updating unit 2160 restores the first threshold value to the before-updated value. Similarly, it is assumed that the result of the evaluation performed by the evaluating unit 2300 indicates that the updating of the second threshold value is not valid. In this case, the updating unit 2160 restores the second threshold value to the before-updated value. As described above, since the first threshold value or the second threshold value is restored to the before-updated value, the before-update value of the first threshold value or the second threshold value are stored in a storage unit in a case where the first threshold value or the second threshold value is updated.

For example, in a case where the result of the evaluation performed by the evaluating unit 2300 indicates that the updating of the threshold value is not valid, the updating unit 2160 may correct the threshold value so as to decrease a degree of updating of the threshold value. For example, it is assumed that the result of the determination performed by the evaluating unit 2300 indicates that the updating of the first threshold value is not valid. In this case, the updating unit 2160 corrects the first threshold value to a value which is smaller than the before-updated value and is smaller than the updated value. This correction is performed based on, for example, the following expression (1).

[Expression 1]

$$Th1 = Th1b - (Th1b - Th1a)*\alpha \quad (1)$$

Th1 represents the corrected first threshold value. Th1b represents the before-updated first threshold value. Th1a represents the updated first threshold value. $\alpha$ is a predefined constant ($0<\alpha<1$).

Similarly, it is assumed that the result of the predefined determination performed by the evaluating unit 2300 indicates that the updating of the second threshold value is not valid. In this case, the updating unit 2160 corrects the second threshold value to a value which is greater than the before-updated value and is smaller than the updated value. This correction is performed based on, for example, the following expression (2).

[Expression 2]

$$Th2 = Th2b + (Th2a - Th2b)*\beta \quad (2)$$

Th2 represents the corrected second threshold value. Th2b represents the before-updated second threshold value. Th2a represents the updated second threshold value. $\beta$ is a predefined constant ($0<\beta<1$). $\beta$ may be the same value as $\alpha$ or may be a different value.

The second requesting unit 2180 transmits the second request at any timing. For example, the second requesting unit 2180 transmits the second request at a timing when the updating of the threshold value is performed by the updating unit 2160.

However, it is desirable that the second requesting unit 2180 transmits the second request at a timing that does not interfere with the predefined determination performed by the information processing system 2000. For example, in a case where the second request is transmitted in a situation in which the network of the information processing system 2000 is congested, there is a possibility that the transmission of the first request necessary for causing the second apparatus 2200 to perform the evaluation is interfered, and there is a possibility that the predefined determination performed by the information processing system 2000 is delayed.

Thus, for example, the second requesting unit 2180 determines whether or not the amount of network traffic flowing between the first apparatus 2100 and the second apparatus 2200 is small (for example, whether or not the amount of network traffic is equal to or smaller than a predefined value). In a case where the amount of network traffic flowing between the first apparatus 2100 and the second apparatus 2200 is equal to or smaller than a predefined value, the second requesting unit 2180 transmits the second request. On the other hand, in a case where the amount of network traffic flowing between the first apparatus 2100 and the second apparatus 2200 is not equal to or smaller than the predefined value, the second requesting unit 2180 delays the transmission of the second request. For example, the second requesting unit 2180 determines again whether or not the amount of network traffic flowing between the first apparatus 2100 and the second apparatus 2200 is equal to or smaller than the predefined value a predefined time later, and transmits the second request in a case where the amount of network traffic is equal to or smaller than the predefined value. Note that, an existing technology may be used as the technology for measuring the amount of traffic between the two apparatuses.

For example, the second requesting unit 2180 determines whether or not the amount of computer resources consumed by the second apparatus 2200 is small. In a case where the amount of computer resources consumed by the second apparatus 2200 is small, the second requesting unit 2180 transmits the second request. On the other hand, in a case where the amount of computer resources consumed by the second apparatus 2200 is not small, the second requesting unit 2180 delays the transmission of the second request. For example, the second requesting unit 2180 determines again whether or not the amount of computer resources consumed by the second apparatus 2200 is small a predefined time later, and transmits the second request in a case where the amount of computer resources is small.

Here, an existing technology may be used as the technology for determining whether or not the amount of computer resources consumed by the computer is small. For example, the second requesting unit 2180 acquires, from the second apparatus 2200, an index value (such as CPU utilization or memory utilization) representing the usage amount of one or more computer resources of the second apparatus 2200. The second requesting unit 2180 computes a comprehensive index value representing a large amount of computer resources consumed by the second apparatus 2200 by using the acquired index value. In a case where the computed comprehensive index value is equal to or smaller than the predefined value, the second requesting unit 2180 determines that the amount of the computer resources consumed by the second apparatus 2200 is small, and determines that the amount of computer resources consumed by the second apparatus 2200 is not small in a case where the computed comprehensive index value is greater than the predefined value. Note that, the determination of whether or not the amount of computer resources consumed by the second apparatus 2200 is small may be performed by the second apparatus 2200. In this case, the first apparatus 2100 acquires the result of the determination performed by the second apparatus 2200.

Note that, the first apparatus 2100 may be connected to the plurality of second apparatuses 2200 as described above. In this case, for example, the second requesting unit 2180 may determine the second apparatus 2200 whose amount of traffic in the network with the first apparatus 2100 is equal to or smaller than the predefined value among the plurality of second apparatuses 2200, and may transmit the second request to the determined second apparatus 2200. In another example, the second requesting unit 2180 may determine the second apparatus 2200 that uses a small amount of computer resources among the plurality of second apparatuses 2200, and may transmit the second request to the determined second apparatus 2200.

There may be the plurality of second apparatuses 2200 whose amount of traffic in the network with the first apparatus 2100 is equal to or smaller than the predefined value, or the plurality of second apparatuses 2200 which use a small amount of computer resources. In this case, it is desirable that the second requesting unit 2180 transmits the second request to the second apparatus 2200 having the smallest amount of traffic or the second apparatus 2200 using the smallest amount of computer resources.

As mentioned above, although the example embodiments of the present invention have been described with reference to the drawings, these example embodiments are merely examples of the present invention, and may adopt a configuration in which the aforementioned example embodiments are combined or various other configurations.

A part or all of the aforementioned example embodiments may be described as in the following appendix, but is not limited thereto.

1. An information processing apparatus comprising:

a determining unit that computes determination accuracy representing a probability that it is correct to use a first result as a result of a predefined determination on a determination target, and performs the predefined determination on the determination target based on the computed determination accuracy, the determining unit outputting the first result as the result of the predefined determination in a case where the determination accuracy is greater than a first threshold value, and outputting a second result as the result of the predefined determination in a case where the determination accuracy is smaller than a second threshold value (the first threshold value>the second threshold value);

a requesting unit that transmits a first request for requesting the predefined determination on the determination target to a first other apparatus in a case where the determination accuracy is equal to or greater than the second threshold value and is equal to or smaller than the first threshold value; and an updating unit that updates at least one of the first threshold value and the second threshold value based on the result of the predefined determination performed by the first other apparatus, wherein the first other apparatus performs the predefined determination by a method different from the determining unit.

2. The information processing apparatus according to 1, wherein the updating unit performs:

determining a first partial range and a second partial range, an upper limit value of the first partial rage being equal to the first threshold value, a lower limit value of the first partial rage being greater than the second threshold value, a lower limit value of the second partial range being equal to the second threshold value, an upper limit value of the second partial rage being smaller than the first threshold value;

updating the first threshold value based on the result of the predefined determination performed by the first other apparatus in a case where the determination accuracy is included in the first partial range; and updating the second threshold value based on the result of the predefined determination performed by the first other apparatus in a case where the determination accuracy is included in the second partial range.

3. The information processing apparatus according to 2, wherein, in a case where a numerical range, whose lower limit value is equal to the second threshold value and upper limit value is equal to the first threshold value, is divided into n (n is an integer of 2 or more) partial ranges, the updating unit sets a partial range having a largest upper limit value as the first partial range, and sets a partial range having a smallest lower limit value as the second partial range.

4. The information processing apparatus according to 2, wherein the determining unit performs the predefined determination on different determination targets, and the updating unit performs:

updates, for each of a predefined number or more of determination targets, the first threshold value to a value equal to the lower limit value of the first partial range in a case where the computed determination accuracy is included in the first partial range and the result of the predefined determination performed by the first other apparatus is the first result; and updates, for each of a predefined number or more of determination targets, the second threshold value to a value equal to the upper limit value of the second partial range in a case where the computed determination accuracy is included in the second partial range and the result of the predefined determination performed by the first other apparatus is the second result.

5. The information processing apparatus according to any one of 1 to 4, wherein after the first threshold value or the second threshold value is updated, in a case where the predefined determination is performed by the first other apparatus a predefined number of times or more or a predefined time elapses, the updating unit updates the first threshold value or the second threshold value again.

6. The information processing apparatus according to any one of 1 to 5, further comprising:

a second requesting unit that transmits a second request for requesting evaluation of validity of the updating of the first threshold value or the second threshold value performed by the updating unit to a second other apparatus.

7. The information processing apparatus according to 6, wherein, in a case where a response to the second request from the second other apparatus indicates that the updating of the first threshold value or the second threshold value is not valid, the updating unit restores the updated first threshold value or second threshold value to a before-updated value.

8. The information processing apparatus according to 6, wherein the updating unit performs:
correcting the first threshold value to a value which is smaller than a before-updated first threshold value and is greater than an updated first threshold value in a case where a response to the second request from the second other apparatus indicates that the updating of the first threshold value is not valid; and
correcting the second threshold value to a value which is greater than a before-updated second threshold value and is smaller than an updated second threshold value in a case where the response to the second request from the second other apparatus indicates that the updating of the second threshold value is not valid.

9. The information processing apparatus according to any one of 6 to 8,
wherein the second requesting unit transmits the second request to the second other apparatus in a case where an amount of computer resources consumed by the second other apparatus is small or an amount of network traffic flowing between the information processing apparatus and the second other apparatus is small.

10. An information processing system comprising a first apparatus and a second apparatus,
wherein the first apparatus includes:
a determining unit that computes determination accuracy representing a probability that it is correct to use a first result as a result of a predefined determination on a determination target, and performs the predefined determination on the determination target based on the computed determination accuracy, the determining unit outputting the first result as the result of the predefined determination in a case where the determination accuracy is greater than a first threshold value, and outputting a second result as the result of the predefined determination in a case where the determination accuracy is smaller than a second threshold value (the first threshold value>the second threshold value),
a requesting unit that transmits a first request for requesting the predefined determination on the determination target to the second apparatus in a case where the determination accuracy is equal to or greater than the second threshold value and is equal to or smaller than the first threshold value, and
an updating unit that updates at least one of the first threshold value and the second threshold value based on the result of the predefined determination performed by the second apparatus, and
the second apparatus includes a determining unit that performs the predefined determination on the determination target by a method different from the determining unit of the first apparatus in response to receiving the first request from the requesting unit, and transmits the result of the predefined determination to the first apparatus.

11. A control method executed by a computer, the method comprising:
a determining step of computing determination accuracy representing a probability that it is correct to use a first result as a result of a predefined determination on a determination target, and performing the predefined determination on the determination target based on the computed determination accuracy; in the determining step, the first result being output as the result of the predefined determination in a case where the determination accuracy is greater than a first threshold value, and a second result being output as the result of the predefined determination in a case where the determination accuracy is smaller than a second threshold value (the first threshold value>the second threshold value);
a requesting step of transmitting a first request for requesting the predefined determination on the determination target to a first other apparatus in a case where the determination accuracy is equal to or greater than the second threshold value and is equal to or smaller than the first threshold value; and
an updating step of updating at least one of the first threshold value and the second threshold value based on the result of the predefined determination performed by the first other apparatus,
wherein the first other apparatus performs the predefined determination by a method different in the determining step.

12. The control method according to 11,
wherein, in the updating step,
determining a first partial range and a second partial range, an upper limit value of the first partial rage being equal to the first threshold value, a lower limit value of the first partial rage being greater than the second threshold value, a lower limit value of the second partial range being equal to the second threshold value, an upper limit value of the second partial rage being smaller than the first threshold value;
updating the first threshold value based on the result of the predefined determination performed by the first other apparatus in a case where the determination accuracy is included in the first partial range; and
updating the second threshold value based on the result of the predefined determination performed by the first other apparatus in a case where the determination accuracy is included in the second partial range.

13. The control method according to 12,
wherein, in a case where a numerical range, whose lower limit value is equal to the second threshold value and upper limit value is equal to the first threshold value, is divided into n (n is an integer of 2 or more) partial ranges, the updating step sets a partial range having a largest upper limit value as the first partial range, and sets a partial range having a smallest lower limit value as the second partial range.

14. The control method according to 12,
wherein the determining step performs the predefined determination on different determination targets, and
the updating step performs:
updates, for each of a predefined number or more of determination targets, the first threshold value to a value equal to the lower limit value of the first partial range in a case where the computed determination accuracy is included in the first partial range and the result of the predefined determination performed by the first other apparatus is the first result; and
updates, for each of a predefined number or more of determination targets, the second threshold value to a value equal to the upper limit value of the second partial range in a case where the computed determination accuracy is included in the second partial range and the result of the predefined determination performed by the first other apparatus is the second result.

15. The control method according to any one of 11 to 14, wherein after the first threshold value or the second threshold value is updated, in a case where the predefined determination is performed by the first other apparatus a predefined number of times or more or a predefined time elapses, the updating step updates the first threshold value or the second threshold value again.

16. The control method according to any one of 11 to 15, further comprising:
a second requesting step of transmitting a second request for requesting evaluation of validity of the updating of the first threshold value or the second threshold value performed in the updating step to a second other apparatus.

17. The control method according to 16, wherein, in a case where a response to the second request from the second other apparatus indicates that the updating of the first threshold value or the second threshold value is not valid, the updating step restores the updated first threshold value or second threshold value to a before-updated value.

18. The control method according to 16, wherein the updating step performs:
correcting the first threshold value to a value which is smaller than a before-updated first threshold value and is greater than an updated first threshold value in a case where a response to the second request from the second other apparatus indicates that the updating of the first threshold value is not valid; and
correcting the second threshold value to a value which is greater than a before-updated second threshold value and is smaller than an updated second threshold value in a case where the response to the second request from the second other apparatus indicates that the updating of the second threshold value is not valid.

19. The control method according to any one of 16 to 18, wherein the second requesting step transmits the second request to the second other apparatus in a case where an amount of computer resources consumed by the second other apparatus is small or an amount of network traffic flowing between the information processing apparatus and the second other apparatus is small.

20. A program causing a computer to execute the steps of the control method according to any one of 11 to 19.

This application claims the priority based on Japanese Patent Application No. 2017-194499 filed on Oct. 4, 2017, the disclosure of which is incorporated herein in its entirety.

What is claimed is:
1. An information processing apparatus comprising:
a determining unit that computes determination accuracy representing a probability that it is correct to use a first result as a result of a predefined determination on a determination target, and performs the predefined determination on the determination target based on the computed determination accuracy, the determining unit outputting the first result as the result of the predefined determination in a case where the determination accuracy is greater than a first threshold value, and outputting a second result as the result of the predefined determination in a case where the determination accuracy is smaller than a second threshold value (the first threshold value >the second threshold value);
a requesting unit that transmits a first request for requesting the predefined determination on the determination target to a first other apparatus in a case where the determination accuracy is equal to or greater than the second threshold value and is equal to or smaller than the first threshold value; and
an updating unit that updates at least one of the first threshold value and the second threshold value based on the result of the predefined determination performed by the first other apparatus,
wherein the first other apparatus performs the predefined determination by a method different from the determining unit.

2. The information processing apparatus according to claim 1,
wherein the updating unit performs:
determining a first partial range and a second partial range, an upper limit value of the first partial rage being equal to the first threshold value, a lower limit value of the first partial rage being greater than the second threshold value, a lower limit value of the second partial range being equal to the second threshold value, an upper limit value of the second partial rage being smaller than the first threshold value;
updating the first threshold value based on the result of the predefined determination performed by the first other apparatus in a case where the determination accuracy is included in the first partial range; and
updating the second threshold value based on the result of the predefined determination performed by the first other apparatus in a case where the determination accuracy is included in the second partial range.

3. The information processing apparatus according to claim 2,
wherein, in a case where a numerical range, whose lower limit value is equal to the second threshold value and upper limit value is equal to the first threshold value, is divided into n (n is an integer of 2 or more) partial ranges, the updating unit sets a partial range having a largest upper limit value as the first partial range, and sets a partial range having a smallest lower limit value as the second partial range.

4. The information processing apparatus according to claim 2,
wherein the determining unit performs the predefined determination on different determination targets, and the updating unit performs:
updates, for each of a predefined number or more of determination targets, the first threshold value to a value equal to the lower limit value of the first partial range in a case where the computed determination accuracy is included in the first partial range and the result of the predefined determination performed by the first other apparatus is the first result; and
updates, for each of a predefined number or more of determination targets, the second threshold value to a value equal to the upper limit value of the second partial range in a case where the computed determination accuracy is included in the second partial range and the result of the predefined determination performed by the first other apparatus is the second result.

5. The information processing apparatus according to claim 1,
wherein after the first threshold value or the second threshold value is updated, in a case where the predefined determination is performed by the first other apparatus a predefined number of times or more or a predefined time elapses, the updating unit updates the first threshold value or the second threshold value again.

6. The information processing apparatus according to claim 1, further comprising:
a second requesting unit that transmits a second request for requesting evaluation of validity of the updating of the first threshold value or the second threshold value performed by the updating unit to a second other apparatus.

7. The information processing apparatus according to claim 6,
wherein, in a case where a response to the second request from the second other apparatus indicates that the updating of the first threshold value or the second threshold value is not valid, the updating unit restores the updated first threshold value or second threshold value to a before-updated value.

8. The information processing apparatus according to claim 6,
wherein the updating unit performs:
correcting the first threshold value to a value which is smaller than a before-updated first threshold value and is greater than an updated first threshold value in a case where a response to the second request from the second other apparatus indicates that the updating of the first threshold value is not valid; and
correcting the second threshold value to a value which is greater than a before-updated second threshold value and is smaller than an updated second threshold value in a case where the response to the second request from the second other apparatus indicates that the updating of the second threshold value is not valid.

9. The information processing apparatus according to claim 6,
wherein the second requesting unit transmits the second request to the second other apparatus in a case where an amount of computer resources consumed by the second other apparatus is small or an amount of network traffic flowing between the information processing apparatus and the second other apparatus is small.

10. An information processing system comprising a first apparatus and a second apparatus,
wherein the first apparatus includes:
a determining unit that computes determination accuracy representing a probability that it is correct to use a first result as a result of a predefined determination on a determination target, and performs the predefined determination on the determination target based on the computed determination accuracy, the determining unit outputting the first result as the result of the predefined determination in a case where the determination accuracy is greater than a first threshold value, and outputting a second result as the result of the predefined determination in a case where the determination accuracy is smaller than a second threshold value (the first threshold value >the second threshold value),
a requesting unit that transmits a first request for requesting the predefined determination on the determination target to the second apparatus in a case where the determination accuracy is equal to or greater than the second threshold value and is equal to or smaller than the first threshold value, and
an updating unit that updates at least one of the first threshold value and the second threshold value based on the result of the predefined determination performed by the second apparatus, and the second apparatus includes a determining unit that performs the predefined determination on the determination target by a method different from the determining unit of the first apparatus in response to receiving the first request from the requesting unit, and transmits the result of the predefined determination to the first apparatus.

11. A control method executed by a computer, the control method comprising:
computing determination accuracy representing a probability that it is correct to use a first result as a result of a predefined determination on a determination target, and performing the predefined determination on the determination target based on the computed determination accuracy; in the determining step, the first result being output as the result of the predefined determination in a case where the determination accuracy is greater than a first threshold value, and a second result being output as the result of the predefined determination in a case where the determination accuracy is smaller than a second threshold value (the first threshold value >the second threshold value);
transmitting a first request for requesting the predefined determination on the determination target to a first other apparatus in a case where the determination accuracy is equal to or greater than the second threshold value and is equal to or smaller than the first threshold value; and
updating at least one of the first threshold value and the second threshold value based on the result of the predefined determination performed by the first other apparatus,
wherein the first other apparatus performs the predefined determination by a method different from the control method.

12. The control method according to claim 11, further comprising:
determining a first partial range and a second partial range, an upper limit value of the first partial rage being equal to the first threshold value, a lower limit value of the first partial rage being greater than the second threshold value, a lower limit value of the second partial range being equal to the second threshold value, an upper limit value of the second partial rage being smaller than the first threshold value;
updating the first threshold value based on the result of the predefined determination performed by the first other apparatus in a case where the determination accuracy is included in the first partial range; and
updating the second threshold value based on the result of the predefined determination performed by the first other apparatus in a case where the determination accuracy is included in the second partial range.

13. The control method according to claim 12, further comprising:
in a case where a numerical range, whose lower limit value is equal to the second threshold value and upper limit value is equal to the first threshold value, is divided into n (n is an integer of 2 or more) partial ranges, setting a partial range having a largest upper limit value as the first partial range, and setting a partial range having a smallest lower limit value as the second partial range.

14. The control method according to claim 12, further comprising:
performing the predefined determination on different determination targets;

updating, for each of a predefined number or more of determination targets, the first threshold value to a value equal to the lower limit value of the first partial range in a case where the computed determination accuracy is included in the first partial range and the result of the predefined determination performed by the first other apparatus is the first result; and updating, for each of a predefined number or more of determination targets, the second threshold value to a value equal to the upper limit value of the second partial range in a case where the computed determination accuracy is included in the second partial range and the result of the predefined determination performed by the first other apparatus is the second result.

15. The control method according to claim 11, further comprising:

after the first threshold value or the second threshold value is updated, in a case where the predefined determination is performed by the first other apparatus a predefined number of times or more or a predefined time elapses, updating the first threshold value or the second threshold value again.

16. The control method according to claim 11 further comprising:

transmitting a second request for requesting evaluation of validity of the updating of the first threshold value or the second threshold value to a second other apparatus.

17. The control method according to claim 16, further comprising:

in a case where a response to the second request from the second other apparatus indicates that the updating of the first threshold value or the second threshold value is not valid, restoring the updated first threshold value or second threshold value to a before-updated value.

18. The control method according to claim 16, further comprising:

correcting the first threshold value to a value which is smaller than a before-updated first threshold value and is greater than an updated first threshold value in a case where a response to the second request from the second other apparatus indicates that the updating of the first threshold value is not valid; and correcting the second threshold value to a value which is greater than a before-updated second threshold value and is smaller than an updated second threshold value in a case where the response to the second request from the second other apparatus indicates that the updating of the second threshold value is not valid.

19. The control method according to claim 16, further comprising:

transmitting the second request to the second other apparatus in a case where an amount of computer resources consumed by the second other apparatus is small or an amount of network traffic flowing between the information processing apparatus and the second other apparatus is small.

20. A non-transitory computer-readable storage medium storing a program causing a computer to execute the control method according to claim 11.

* * * * *